(12) United States Patent
Kuwahara et al.

(10) Patent No.: US 11,010,311 B2
(45) Date of Patent: May 18, 2021

(54) PROCESSING DEVICE AND METHOD FOR CONTROLLING PROCESSING DEVICE

(71) Applicant: FUJITSU LIMITED, Kawasaki (JP)

(72) Inventors: Kotaro Kuwahara, Suginami (JP); Yuki Yoshida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/391,698

(22) Filed: Apr. 23, 2019

(65) Prior Publication Data

US 2019/0347215 A1 Nov. 14, 2019

(30) Foreign Application Priority Data

May 14, 2018 (JP) .............................. JP2018-092827

(51) Int. Cl.
*G06F 12/14* (2006.01)
*G06F 12/10* (2016.01)

(52) U.S. Cl.
CPC .......... *G06F 12/1425* (2013.01); *G06F 12/10* (2013.01); *G06F 2212/1052* (2013.01); *G06F 2212/657* (2013.01)

(58) Field of Classification Search
CPC .................. G06F 12/1425; G06F 12/10; G06F 2212/1052; G06F 2212/657
See application file for complete search history.

(56) References Cited

U.S. PATENT DOCUMENTS

| 5,604,864 | A | 2/1997 | Noda |
| 2007/0214340 | A1* | 9/2007 | Leveille .............. G06F 12/1483 711/203 |
| 2009/0187732 | A1* | 7/2009 | Greiner ............... G06F 12/1009 711/208 |
| 2014/0298334 | A1* | 10/2014 | Munetoh ............. G06F 11/3471 718/1 |

FOREIGN PATENT DOCUMENTS

| JP | 05-173884 | 7/1993 |
| JP | 07-319735 | 12/1995 |

* cited by examiner

*Primary Examiner* — Eric Cardwell
(74) *Attorney, Agent, or Firm* — Fujitsu Patent Center

(57) ABSTRACT

A processing device includes a processor configured to output a memory access instruction issued by a process executed on a virtual machine and a virtual address targeted by the memory access instruction. The processor is configured to perform first translation of translating the virtual address into a real address of a virtual memory. The processor is configured to perform second translation of translating the real address into a physical address of a physical memory. The processor is configured to determine, based on the memory access instruction and an access permission attribute of the real address, whether an access permission violation occurs. The processor is configured to perform, upon determining that an access permission violation occurs, retranslation of translating the virtual address into the real address. The processor is configured to record the virtual address and the real address obtained by the retranslation in a log area of a memory.

6 Claims, 9 Drawing Sheets

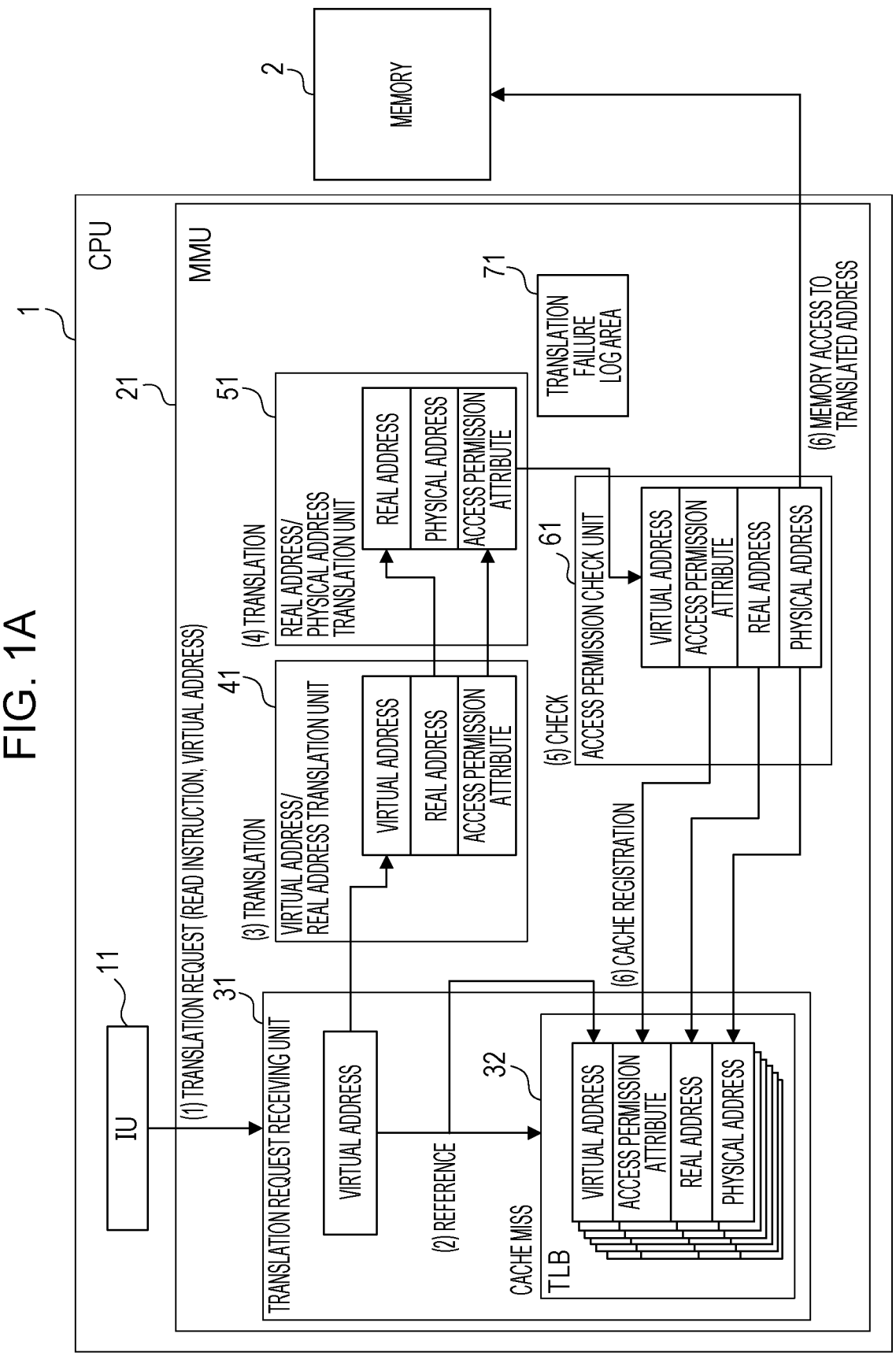

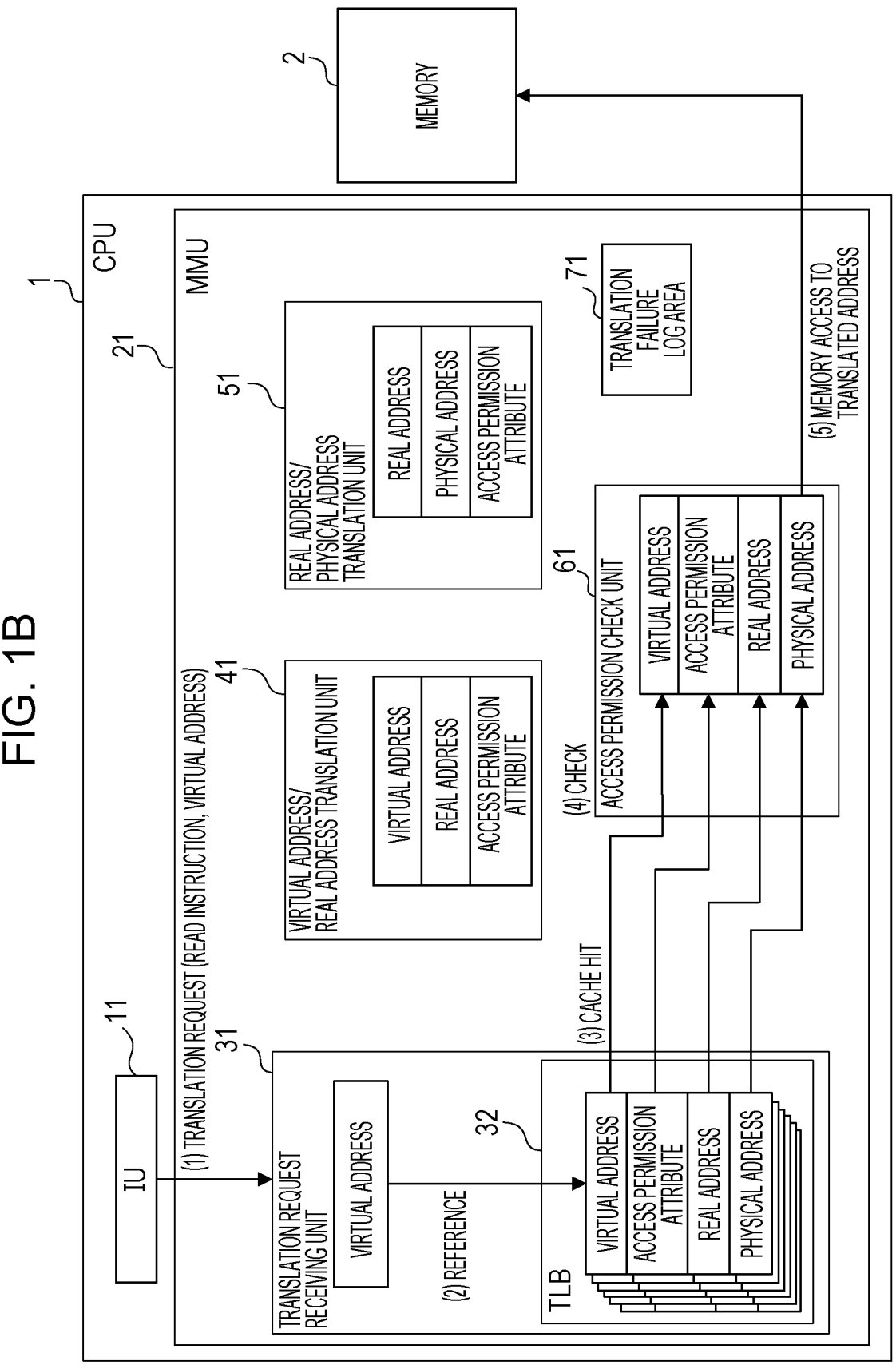

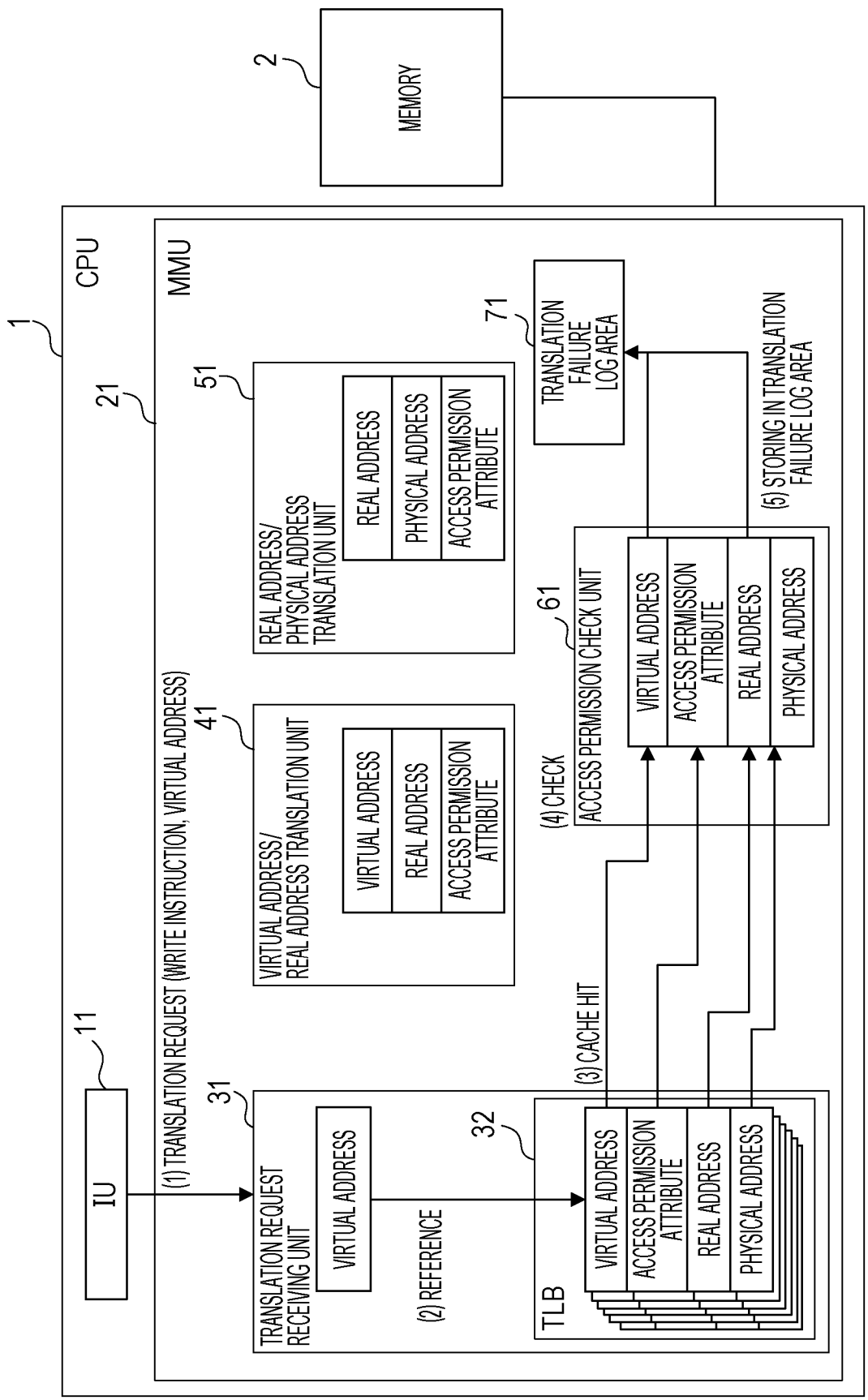

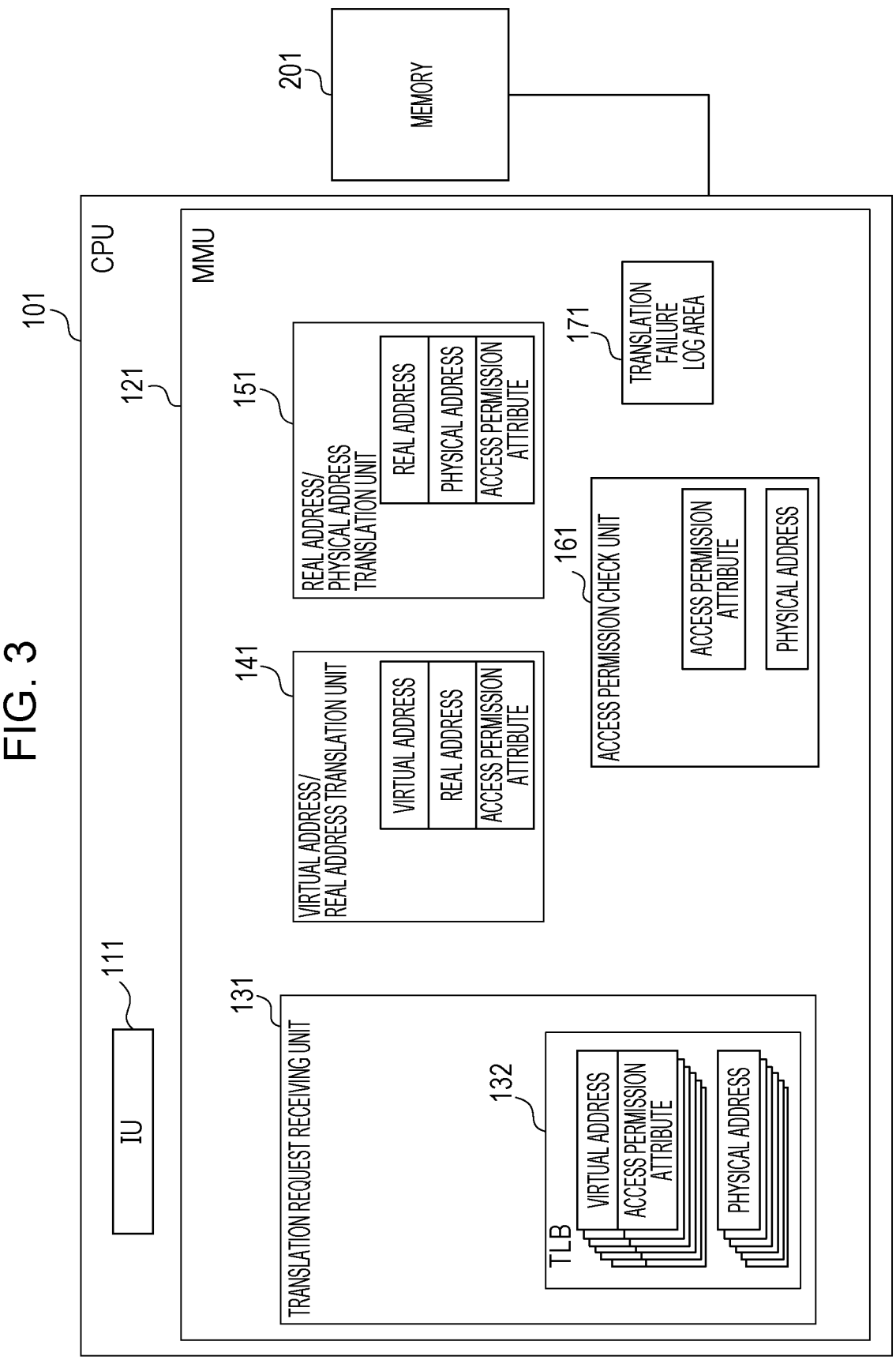

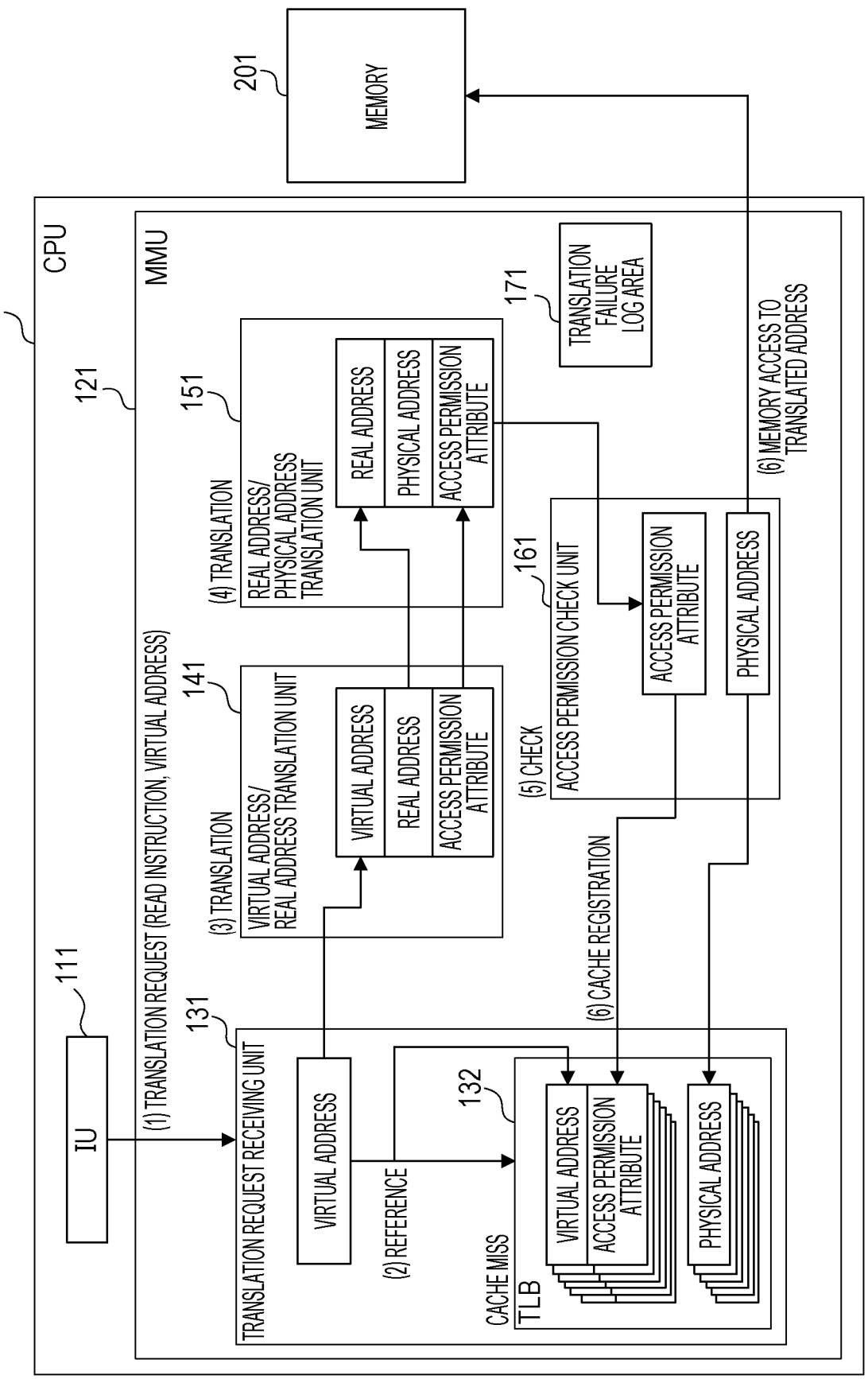

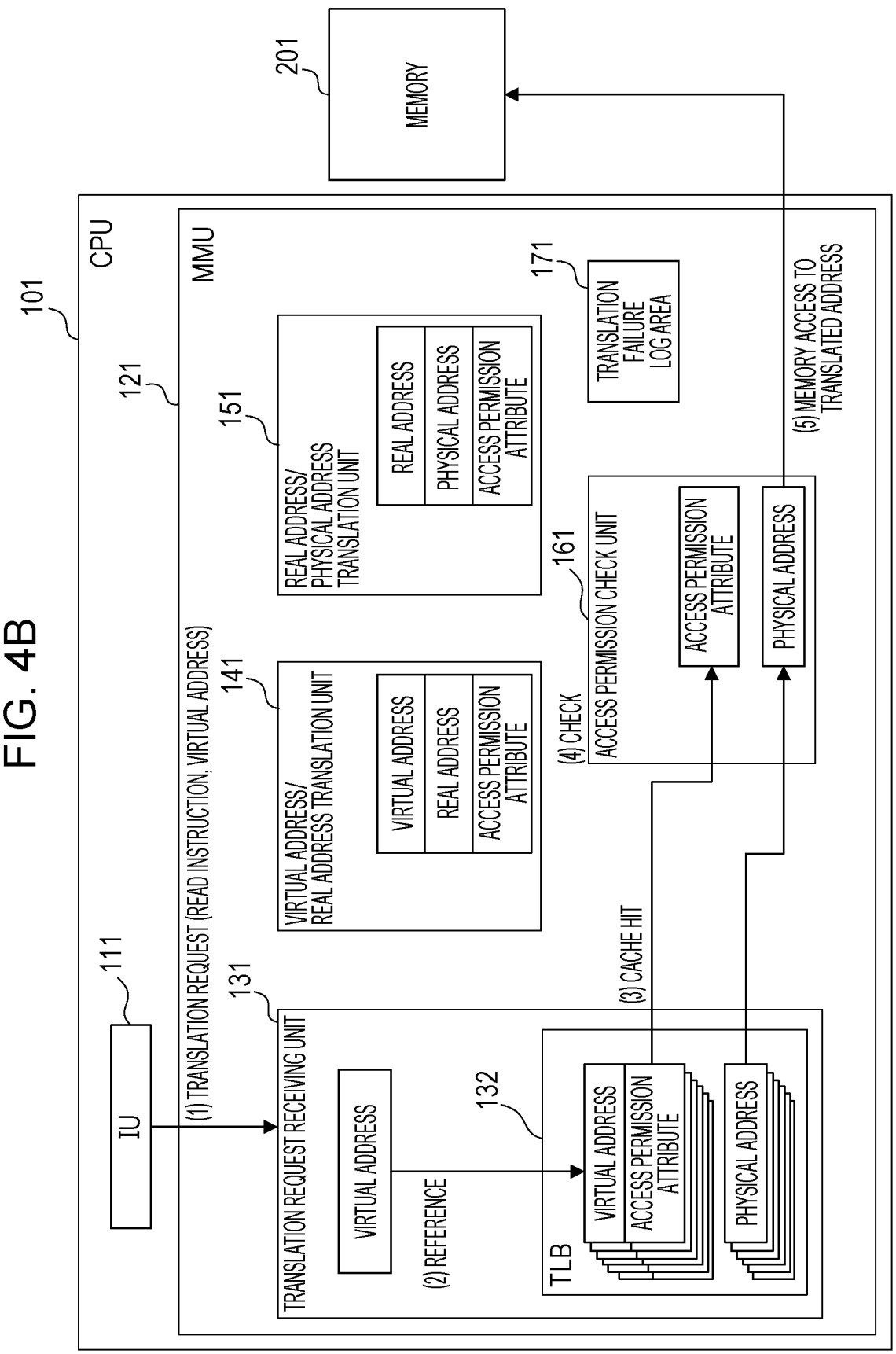

PROCESSING DEVICE AND METHOD FOR CONTROLLING PROCESSING DEVICE

CROSS-REFERENCE TO RELATED APPLICATION

This application is based upon and claims the benefit of priority of the prior Japanese Patent Application No. 2018-92827, filed on May 14, 2018, the entire contents of which are incorporated herein by reference.

FIELD

The embodiment discussed herein is related to a processing device and a method for controlling a processing device.

BACKGROUND

When a central processing unit (CPU) performs computational processing, data to be used for the processing is written to a memory of an information processing apparatus, or read from the memory; that is, memory access is performed. Such memory access is performed by using a memory address to specify the location to be accessed in a memory area.

Different portions of the entire memory area are allocated to different processes running on the CPU, each of which performs a particular kind of processing, so that the different processes may separately use the different portions allocated thereto. Since the desired memory size and the desired timing of allocating the memory area vary among processes, multiple areas with non-contiguous addresses may be allocated to a process due to allocation constraints. However, it is not easy for a process to use multiple areas with non-contiguous addresses. Furthermore, it is easier for a process if an area starting from a particular address is consistently allocated to a particular process.

To address these problems, CPUs usually have address translation mechanisms. In this case, it seems as if a contiguous memory area is allocated to each process. When the process issues a memory access request to an address in the contiguous memory area, the address translation mechanism translates the address into an address in non-contiguous memory areas that are actually allocated to the process, and memory access to an information processing apparatus is performed.

In recent years, the use of virtual machines has been widespread. The mechanism of a virtual machine is such that one or more virtual machines run on a physical device that is actually present and a user operating a virtual machine feels to be operating a physical device or a process running on the virtual machine appears to be running on the physical device. In this mechanism, the area of memory physically included in the physical device is separated and allocated to the one or more virtual machines as virtual memories. Also at this time, due to similar reasons as described above, address translation is performed. When a process running on a virtual machine accesses an address (hereinafter referred to as a virtual address) of a memory area allocated to the process, the virtual address is translated into another address (hereinafter referred to as a real address) of virtual memory of the virtual machine, and the real address of the virtual memory is in turn translated into a physical address of physical memory of the physical device, which is allocated to the virtual machine. Such an address translation mechanism capable of performing address translation multiple times is employed in many kinds of CPU.

Such address translation is designed to perform various kinds of translation by enabling external setting of configuration for translation such that an address area used by a process is translated into a particular address area. A device in which an operating system (OS), which is fundamental software in an information processing apparatus, and application software are reconfigured as desired, usually allows setting of the configuration for translation as desired after the device is started. In recent devices, the configuration for translation is more complex to achieve more flexible translation. As a result, due to errors in the configuration for translation or faults (that is, bugs) in a memory access component of particular software, translation may fail. At this time, the address translation mechanism usually records the kind of memory access that has failed and the reason for the failure. This enables software designers to more easily carry out debugging.

In addition, to handle the configuration for translation relating to a larger number of virtual machines and a larger number of processes, numerous configuration settings are required. To deal with this, in recent technologies, the configurations for translation are recorded in a memory and only a required configuration for translation is read from the memory when performing address translation processing. However, such a system takes a relatively long time to retrieve the configuration for translation, resulting in degraded memory access performance. To address this issue, an address translation circuit usually includes a circuit for caching the configuration for translation that is read from the memory, and as a result, translation is performed faster from the second translation. The circuit for caching the configuration for translation is usually referred to as a translation lookaside buffer (TLB). Furthermore, to handle complex translation processing such as two-step translation that takes a relatively long time, a known address translation circuit caches a real address obtained by translating an input virtual address, a physical address obtained by translating the real address, or a physical address obtained by translating a virtual address, and as a result, translation processing is performed faster from the second translation processing.

Related techniques are disclosed in, for example, Japanese Laid-open Patent Publication No. 5-173884 and Japanese Laid-open Patent Publication No. 7-319735.

In an address translation mechanism, access permission is usually set as an address attribute of the translated real address or the translated physical address to protect memory from prohibited memory access, such as write access to a memory area to which write access permission is not set. Specifically, access permission that indicates whether a particular memory area corresponding to an address obtained in translation processing is a writable area or a readable area is also recorded as a configuration for translation and consequently registered in the TLB.

When the cache of a translation entry that is stored in the TLB is hit (cache hit) and an access permission violation is detected, a log entry about a corresponding virtual address or a corresponding real address is registered as information for debugging. Thus, in addition to a physical address, which is the final translation result address, a real address is also stored in the TLB.

Fundamentally, only a virtual address that is input and a physical address that is to be accessed are required as address information when translation is successfully completed. However, a real address is also stored in the TLB in case of translation failure such as an access permission violation, and this results in a problem in which the circuit area and the power consumption increase.

SUMMARY

According to an aspect of the present invention, provided is a processing device including a memory and a processor coupled to the memory. The memory includes a log area. The processor is configured to output a memory access instruction issued by a process executed on a virtual machine and a virtual address targeted by the memory access instruction. The processor is configured to perform first translation of translating the virtual address into a real address of a virtual memory. The processor is configured to perform second translation of translating the real address into a physical address of a physical memory. The processor is configured to determine, based on the memory access instruction and an access permission attribute of the real address, whether an access permission violation occurs. The processor is configured to perform, upon determining that an access permission violation occurs, retranslation of translating the virtual address into the real address. The processor is configured to record the virtual address and the real address obtained by the retranslation in the log area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A illustrates a read access operation at the first time in a comparative example;

FIG. 1B illustrates a read access operation at the second time in the comparative example;

FIG. 1C illustrates a write access operation after a read access operation of the comparative example;

FIG. 3 illustrates a configuration of a CPU according to an embodiment;

FIG. 4A illustrates a read access operation at the first time according to the embodiment;

FIG. 4B illustrates a read access operation at the second time according to the embodiment;

DESCRIPTION OF EMBODIMENT

Figure 2:
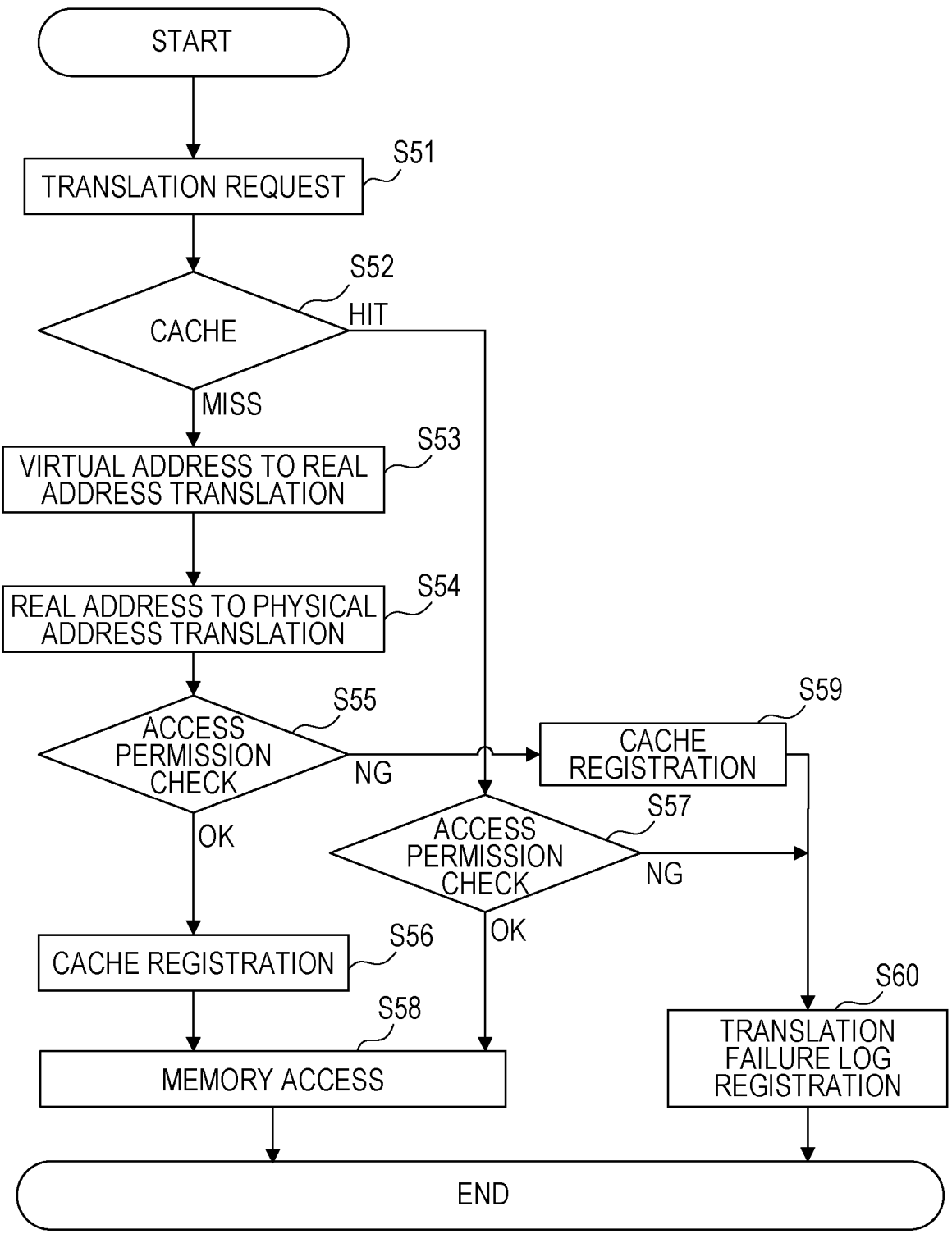
FIG. 2 is a flowchart illustrating a control method of the comparative example.

Hereinafter, an embodiment is described with reference to the drawings. A comparative example is described first, and the embodiment is described second.

FIG. 1A illustrates a read access operation at the first time in the comparative example. In this example, an example of access to a memory area to which write access permission is not set is described.

A CPU 1 includes an instruction unit (IU) 11 and a memory management unit (MMU) 21. The MMU 21 includes a translation request receiving unit 31, a virtual address/real address translation unit 41, a real address/physical address translation unit 51, an access permission check unit 61, and a translation failure log area 71. The translation request receiving unit 31 includes a TLB 32. The TLB 32 stores therein a virtual address, an access permission attribute, a real address, and a physical address in association with each other. The CPU 1 runs, for example, a virtual machine to which at least a portion of a memory 2 is allocated as a virtual memory, a guest OS that runs on the virtual machine, and a hypervisor that manages the virtual machine. In addition, multiple processes run on the virtual machine, and a memory area (a virtual address space) is allocated to each of the processes and used by each of the processes. The virtual memory allocated to the virtual machine is seen as a physical memory by the virtual machine, and an address of the virtual memory corresponding to a physical address is referred to as a real address. An address of a memory area (a virtual address space) used by a process is referred to as a virtual address.

(1) A process executed on a virtual machine run by the CPU 1 issues a read instruction for a memory area allocated to the process. The IU 11 outputs a translation request to the MMU 21 in accordance with the read instruction. The translation request contains the read instruction and a virtual address of a memory area targeted by the read instruction.

(2) The translation request receiving unit 31 receives the translation request. The translation request receiving unit 31 refers to the TLB 32 and checks whether the virtual address contained in the translation request is included in the TLB 32. Since this is the first read access, the virtual address contained in the received translation request is not stored in the TLB 32, resulting in a cache miss. The translation request receiving unit 31 outputs the read instruction and the virtual address to the virtual address/real address translation unit 41.

(3) The virtual address/real address translation unit 41 receives the read instruction and the virtual address. The virtual address/real address translation unit 41 translates the received virtual address into a real address. The virtual address/real address translation unit 41 outputs the received read instruction, the translated real address, and an access permission attribute associated with the translated real address to the real address/physical address translation unit 51. It is assumed that the access permission attribute is read-only (reading is permitted but writing is not permitted).

(4) The real address/physical address translation unit 51 receives the read instruction, the real address, and the access permission attribute. The real address/physical address translation unit 51 translates the received real address into a physical address. The real address/physical address translation unit 51 outputs the received read instruction, the received real address, the translated physical address, and the received access permission attribute to the access permission check unit 61.

(5) The access permission check unit 61 receives the read instruction, the virtual address, the real address, the physical address, and the access permission attribute. The access permission check unit 61 checks (determines) whether an access permission violation occurs based on the received read instruction and the received access permission attribute. In this example, the received instruction is a read instruction and the access permission attribute is read-only, and as a result, it is determined that no access permission violation occurs.

(6) The access permission check unit 61 performs a read operation for the received physical address of the memory 2 and also outputs the received access permission attribute, the received real address, and the received physical address to the TLB 32. The TLB 32 stores therein the virtual address received from the translation request receiving unit 31 and the access permission attribute, the real address, and the physical address, which are received from the access permission check unit 61, in association with each other.

Next, the second read access operation after the first read access operation is described. FIG. 1B illustrates a read access operation at the second time in the comparative example.

(1) The process executed on the virtual machine run by the CPU 1 issues a read instruction for the memory area allocated to the process. The IU 11 outputs a translation request to the MMU 21 in accordance with the read instruction. The translation request contains the read instruction and a virtual address of a memory area targeted by the read instruction. It is assumed that the virtual address is identical to the virtual address used in the first read access operation in FIG. 1A.

(2) The translation request receiving unit 31 receives the translation request. The translation request receiving unit 31 refers to the TLB 32 and checks whether the virtual address contained in the translation request is included in the TLB 32.

(3) The received virtual address used in the second read access operation is identical to the virtual address used in the first read access operation, which is already stored in the TLB 32, and therefore the received virtual address is already present in the TLB 32, resulting in a cache hit. The translation request receiving unit 31 outputs the read instruction and the received virtual address to the access permission check unit 61 along with an access permission attribute, the real address, and the physical address, which are associated with the received virtual address.

(4) The access permission check unit 61 receives the read instruction, the virtual address, the access permission attribute, the real address, and the physical address. The access permission check unit 61 checks (determines) whether an access permission violation occurs based on the received read instruction and the received access permission attribute. In this example, the received instruction is a read instruction and the access permission attribute is read-only, and it is determined that no access permission violation occurs.

(5) The access permission check unit 61 performs a read operation for the received physical address of the memory 2.

Next, a write access operation after the first or second read access operation is described.

FIG. 1C illustrates a write access operation after a read access operation of the comparative example.

(1) The process executed on the virtual machine run by the CPU 1 issues a write instruction for the memory area allocated to the process. The IU 11 outputs a translation request to the MMU 21 in accordance with the write instruction. The translation request contains the write instruction and a virtual address of a memory area targeted by the write instruction. It is assumed that the virtual address is identical to the virtual address used in the first read access operation in FIG. 1A.

(2) The translation request receiving unit 31 receives the translation request. The translation request receiving unit 31 refers to the TLB 32 and checks whether the virtual address contained in the translation request is included in the TLB 32.

(3) Because the received virtual address used in the write access operation is identical to the virtual address used in the first read access operation, the received virtual address is stored in the TLB 32, resulting in a cache hit. The translation request receiving unit 31 outputs the write instruction and the received virtual address to the access permission check unit 61 along with an access permission attribute, the real address, and the physical address which are associated with the received virtual address.

(4) The access permission check unit 61 receives the write instruction, the virtual address, the access permission attribute, the real address, and the physical address. The access permission check unit 61 checks (determines) whether an access permission violation occurs based on the received write instruction and the received access permission attribute. In this example, the received instruction is a write instruction and the access permission attribute is read-only, and it is determined that an access permission violation occurs.

(5) The access permission check unit 61 records the received virtual address and the received real address in the translation failure log area 71 as an error log entry.

FIG. 2 is a flowchart illustrating the control method of the comparative example. In step S51, a process executed on a virtual machine run by the CPU 1 issues a memory access instruction (a read instruction or a write instruction) for a memory area (a virtual address space) allocated to the process. The IU 11 outputs a translation request to the MMU 21 in accordance with the memory access instruction issued by the process. The translation request contains the memory access instruction (a read instruction or a write instruction) and a virtual address of a memory area that is allocated to the process and that is targeted by the memory access instruction.

In step S52, the translation request receiving unit 31 receives the translation request. The translation request receiving unit 31 refers to the TLB 32 and checks whether the virtual address contained in the translation request is included in the entries of the TLB 32. In a case where the virtual address contained in the translation request is included in the entries of the TLB 32 (in a case of a cache hit), the translation request receiving unit 31 outputs the memory access instruction and the received virtual address to the access permission check unit 61 along with an access permission attribute, the real address, and the physical address, which are associated with the received virtual address. The control processing subsequently proceeds to step S57. In a case where the virtual address contained in the translation request is not included in the entries of the TLB 32 (in a case of a cache miss), the translation request receiving unit 31 outputs the memory access instruction and the virtual address to the virtual address/real address translation unit 41 and outputs the virtual address to the access permission check unit 61. The control processing subsequently proceeds to step S53.

In step S53, the virtual address/real address translation unit 41 receives the memory access instruction and the virtual address. The virtual address/real address translation unit 41 translates the received virtual address into a real address. The virtual address/real address translation unit 41 outputs the received memory access instruction, the translated real address, and an access permission attribute associated with the translated real address to the real address/physical address translation unit 51.

In step S54, the real address/physical address translation unit 51 receives the memory access instruction, the real address, and the access permission attribute. The real address/physical address translation unit 51 translates the received real address into a physical address. The real address/physical address translation unit 51 outputs the received memory access instruction, the received real address, the translated physical address, and the received access permission attribute to the access permission check unit 61.

In step S55, the access permission check unit 61 receives the memory access instruction, the virtual address, the real address, the physical address, and the access permission attribute. The access permission check unit 61 checks (determines) whether an access permission violation occurs based on the received memory access instruction and the received access permission attribute. In a case where it is determined that no access permission violation occurs (OK), the control processing proceeds to step S56. In a case where it is determined that an access permission violation occurs (NG), the control processing proceeds to step S59.

In step S56, the access permission check unit 61 outputs the received access permission attribute, the received real address, and the received physical address to the TLB 32. The TLB 32 stores the virtual address received from the translation request receiving unit 31 and the access permission attribute, the real address, and the physical address, which are received from the access permission check unit 61, in association with each other.

In step S57, the access permission check unit 61 receives the memory access instruction, the virtual address, the real address, the physical address, and the access permission attribute. The access permission check unit 61 checks (determines) whether an access permission violation occurs based on the received memory access instruction and the received access permission attribute. In a case where it is determined that no access permission violation occurs (OK), the control processing proceeds to step S58. In a case where it is determined that an access permission violation occurs (NG), the control processing proceeds to step S60.

In step S58, the access permission check unit 61 performs a memory access operation for the received physical address of the memory 2.

In step S59, the access permission check unit 61 outputs the received access permission attribute, the received real address, and the received physical address to the TLB 32. The TLB 32 stores the virtual address received from the translation request receiving unit 31 and the access permission attribute, the real address, and the physical address, which are received from the access permission check unit 61, in association with each other.

In step S60, the access permission check unit 61 records the received virtual address and the received real address in the translation failure log area 71 as an error log entry.

FIG. 3 illustrates a configuration of a CPU according to the embodiment. A CPU 101 includes an IU 111 and an MMU 121. The CPU 101 is coupled to a memory 201 via a bus. The memory 201 is also referred to as a physical memory for the purpose of differentiating from a virtual memory. The CPU 101 is an example of a processing device (a processor). The CPU 101 and the memory 201 are installed in, for example, an information processing apparatus (a computer), such as a server or a personal computer. The CPU 101 executes programs such as a program for implementing a virtual machine, a guest OS that runs on the virtual machine, and a hypervisor that manages the virtual machine. At least one portion of the memory 201 is allocated to the virtual machine as a virtual memory. The virtual memory allocated to the virtual machine is seen as a physical memory by the virtual machine, and an address of the virtual memory corresponding to a physical address is referred to as a real address (a virtual physical address). In addition, multiple processes run on the virtual machine, and a memory area (a virtual address space) is allocated to each of the processes and used by each of the processes. An address of a memory area (a virtual address space) used by a process is referred to as a virtual address.

The IU 111 outputs a translation request to the MMU 121 in accordance with a memory access instruction issued by a process executed on a virtual machine run by the CPU 101. The IU 111 is an example of an instruction control unit.

The MMU 121 includes a translation request receiving unit 131, a virtual address/real address translation unit 141, a real address/physical address translation unit 151, an access permission check unit 161, and a translation failure log area 171. The translation request receiving unit 131 includes a TLB 132.

The TLB 132 stores multiple entries in each of which a virtual address, an access permission attribute, and a physical address are stored in association with each other. The virtual address is an address of a memory area (a virtual address space) used by a process. The access permission attribute denotes access permission with respect to a real address (or a physical address) corresponding to a virtual address. The access permission attribute is, for example, read-only (reading is permitted but writing is not permitted) or read and write (both reading and writing are permitted). The physical address is a physical address of the memory 201 corresponding to a real address corresponding to a virtual address. The TLB 132 is an example of a cache.

The translation request receiving unit 131 receives a translation request, refers to the TLB 132, searches the TLB 132 by using a virtual address contained in the translation request as a search key, and checks whether any entry in the TLB 132 includes the virtual address contained in the translation request; in other words, the translation request receiving unit 131 determines whether the virtual address contained in the translation request matches an address included in any entry in the TLB 132 (determines whether a cache hit or a cache miss occurs). The translation request receiving unit 131 is an example of a determination unit.

The virtual address/real address translation unit 141 translates an input virtual address into a real address of virtual memory of a virtual machine corresponding to the virtual address.

The real address/physical address translation unit 151 translates an input real address into a physical address of the memory 201 corresponding to the real address. The virtual address/real address translation unit 141 and the real address/physical address translation unit 151 are examples of a translation unit.

The access permission check unit 161 checks (determines) whether an access permission violation occurs based on a memory access instruction (a read instruction or a write instruction) contained in the translation request and an access permission attribute.

The translation failure log area 171 stores, as an error log entry, a virtual address and a real address obtained by translating the virtual address with respect to which it is determined that an access permission violation occurs. The translation failure log area 171 is, for example, a register. The translation failure log area 171 is an example of a log area.

Hereinafter, access processing performed by using the CPU according to the embodiment is described. Firstly, the processing of the first read access operation is described. This example describes an access operation to a memory area to which write permission is not set.

FIG. 4A illustrates a read access operation at the first time according to the embodiment.

(1) A process executed on the virtual machine run by the CPU 101 issues a read instruction for the memory area allocated to the process. The IU 111 outputs a translation request to the MMU 121 in accordance with the read instruction. The translation request contains the read instruction and a virtual address of a memory area targeted by the read instruction.

(2) The translation request receiving unit 131 receives the translation request. The translation request receiving unit 131 refers to the TLB 132 and checks whether the virtual address contained in the translation request is included in the TLB 132. Since this is the first read access, the virtual address contained in the received translation request is not stored in the TLB 132, resulting in a cache miss. The translation request receiving unit 131 outputs the read instruction and the virtual address to the virtual address/real address translation unit 141.

(3) The virtual address/real address translation unit 141 receives the read instruction and the virtual address. The virtual address/real address translation unit 141 translates the received virtual address into a real address. The virtual address/real address translation unit 141 outputs the received read instruction, the translated real address, and an access permission attribute associated with the translated real address to the real address/physical address translation unit 151. It is assumed that the access permission attribute is read-only (reading is permitted but writing is not permitted). An access permission attribute is set in advance in association with each real address.

(4) The real address/physical address translation unit 151 receives the read instruction, the real address, and the access permission attribute. The real address/physical address translation unit 151 translates the received real address into a physical address. The real address/physical address translation unit 151 outputs the received read instruction, the received real address, the translated physical address, and the received access permission attribute to the access permission check unit 161.

(5) The access permission check unit 161 receives the read instruction, the real address, the physical address, and the access permission attribute. The access permission check unit 161 checks (determines) whether an access permission violation occurs based on the received read instruction and the received access permission attribute. In this example, the received instruction is a read instruction and the access permission attribute is read-only, and it is determined that no access permission violation occurs.

(6) The access permission check unit 161 performs a read operation for the received physical address of the memory 201 and also outputs the received access permission attribute and the received physical address to the TLB 132. The TLB 132 stores therein the virtual address received from the translation request receiving unit 131, and the access permission attribute and the physical address which are received from the access permission check unit 161, in association with each other.

Since the TLB 132 of the CPU 101 according to the embodiment does not store therein a real address, the circuit area of the TLB 132 may be downsized.

Next, the second read access operation after the first read access operation is described. FIG. 4B illustrates a read access operation at the second time according to the embodiment.

(1) The process executed on the virtual machine run by the CPU 101 issues a read instruction for the memory area allocated to the process. The IU 111 outputs a translation request to the MMU 121 in accordance with the read instruction. The translation request contains the read instruction and a virtual address of a memory area targeted by the read instruction. It is assumed that the virtual address is identical to the virtual address used in the first read access operation in FIG. 4A.

(2) The translation request receiving unit 131 receives the translation request. The translation request receiving unit 131 refers to the TLB 132 and checks whether the virtual address contained in the translation request is included in the TLB 132.

(3) The received virtual address used in the second read access operation is identical to the virtual address used in the first read access operation, which is already stored in the TLB 32, and therefore the received virtual address is already present in the TLB 132, resulting in a cache hit. The translation request receiving unit 131 outputs the read instruction, an access permission attribute associated with the received virtual address, and the physical address to the access permission check unit 161.

(4) The access permission check unit 161 receives the read instruction, the access permission attribute, and the physical address. The access permission check unit 61 checks (determines) whether an access permission violation occurs based on the received read instruction and the received access permission attribute. In this example, the received instruction is a read instruction and the access permission attribute is read-only, and it is determined that no access permission violation occurs.

(5) The access permission check unit 161 performs a read operation for the received physical address of the memory 201.

Next, a write access operation after the first or second read access operation is described.

Figure 4C:
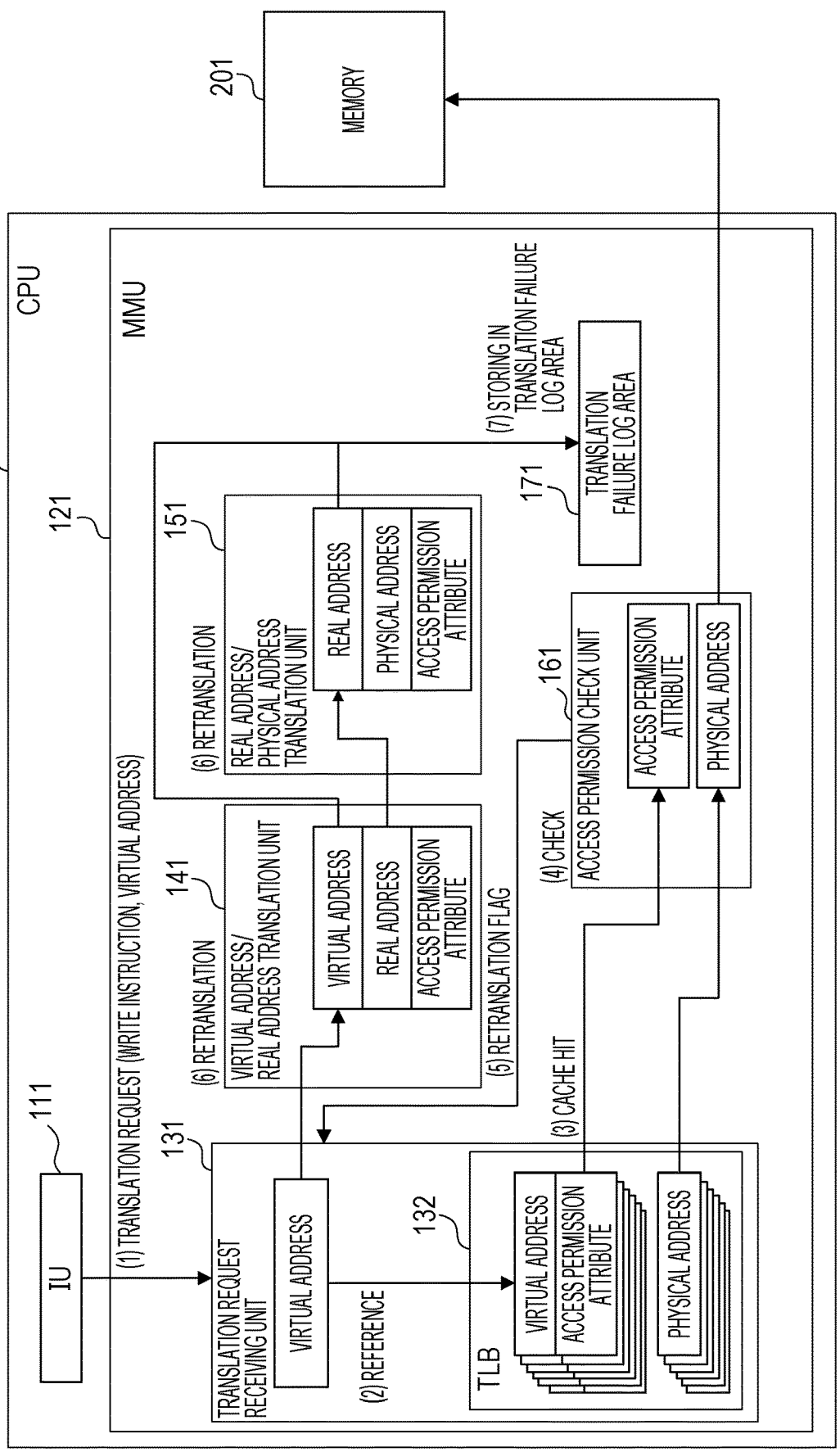
FIG. 4C illustrates a write access operation after a read access operation according to the embodiment.

FIG. 4C illustrates a write access operation after a read access operation according to the embodiment.

(1) The process executed on the virtual machine run by the CPU 101 issues a write instruction for the memory area allocated to the process. The IU 111 outputs a translation request to the MMU 121 in accordance with the write instruction. The translation request contains the write instruction and a virtual address of a memory area targeted by the write instruction. It is assumed that the virtual address is identical to the virtual address used in the first read access operation in FIG. 4A.

(2) The translation request receiving unit 131 receives the translation request. The translation request receiving unit 131 refers to the TLB 132 and checks whether the virtual address contained in the translation request is included in the TLB 132.

(3) Because the received virtual address used in the write access operation is identical to the virtual address used in the first read access operation, the received virtual address is stored in the TLB 132, resulting in a cache hit. The translation request receiving unit 131 outputs the write instruction, an access permission attribute associated with the received virtual address, and the physical address to the access permission check unit 161.

(4) The access permission check unit 161 receives the write instruction, the access permission attribute, and the physical address. The access permission check unit 161 checks (determines) whether an access permission violation occurs based on the received write instruction and the received access permission attribute. In this example, the received instruction is a write instruction and the access permission attribute is read-only, it is determined that an access permission violation occurs.

(5) The access permission check unit 161 sets a retranslation flag to a ON state and notifies the translation request receiving unit 131 of the retranslation flag.

(6) Upon receiving the retranslation flag, the translation request receiving unit 131 outputs the retranslation flag and the virtual address contained in the translation request to the virtual address/real address translation unit 141. The virtual address/real address translation unit 141 receives the retranslation flag and the virtual address. The virtual address/real address translation unit 141 translates the received virtual address into a real address. The virtual address/real address translation unit 141 outputs the retranslation flag and the translated real address to the real address/physical address translation unit 151. The real address/physical address translation unit 151 receives the retranslation flag and the real address. The real address/physical address translation unit 151 translates the received real address into a physical address.

(7) Upon receiving the retranslation flag, the virtual address/real address translation unit 141 records the received virtual address in the translation failure log area 171 as an error log entry. Upon receiving the retranslation flag, the real address/physical address translation unit 151 records the received real address in association with the virtual address in the translation failure log area 171 as an error log entry. It is noted that, the virtual address/real address translation unit 141 may record the received virtual address and the translated real address in association with each other in the translation failure log area 171 as an error log entry upon receiving the retranslation flag.

In the CPU of the comparative example, when an access permission violation is detected, a real address to be recorded as an error log entry is obtained from the TLB, and therefore, a resource for the TLB to store the real address is required. By contrast, in the CPU according to the embodiment, when an access permission violation is detected, a real address to be recorded as an error log entry is obtained by the virtual address/real address translation unit that translates the virtual address again, and therefore, the TLB is not required to retain the real address.

In the CPU according to the embodiment, when an access permission violation occurs, the address translation processing is performed again, but as the occurrence of the violation of access permission is a special (rare) case, a slight delay in registration of an error log entry does not cause a significant effect. Rather, since it is not required to secure the area for storing real addresses with respect to multiple entries in the TLB, it is possible to considerably reduce the resource and power consumption.

Figure 5:
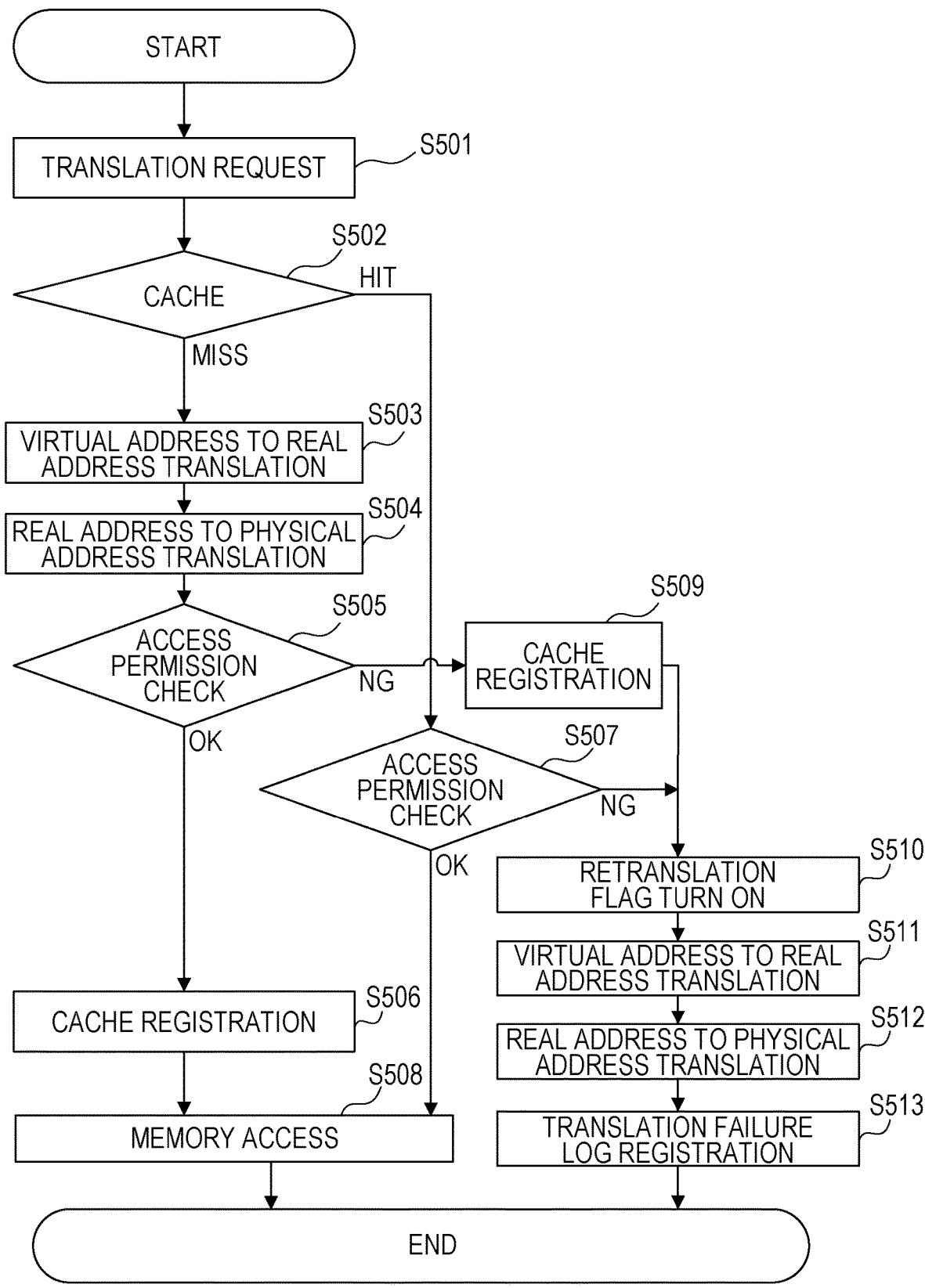
FIG. 5 is a flowchart illustrating a control method according to the embodiment.

FIG. 5 is a flowchart illustrating a control method according to the embodiment. In step S501, a process executed on a virtual machine run by the CPU 101 issues a memory access instruction (a read instruction or a write instruction) for a memory area (a virtual address space) allocated to the process. The IU 111 outputs a translation request to the MMU 121 in accordance with the memory access instruction issued by the process. The translation request contains the memory access instruction (the read instruction or the write instruction) and a virtual address of the memory area that is allocated to the process and that is targeted by the memory access instruction.

In step S502, the translation request receiving unit 131 receives the translation request. The translation request receiving unit 131 refers to the TLB 132, searches the TLB 132 by using the virtual address contained in the translation request as a search key, and checks whether any entry in the TLB 132 includes the virtual address contained in the translation request. In a case where the virtual address contained in the translation request is included in the entries of the TLB 132 (in a case of a cache hit), the translation request receiving unit 131 outputs the memory access instruction, an access permission attribute associated with the received virtual address, and the physical address to the access permission check unit 161. The control processing subsequently proceeds to step S507. In a case where the virtual address contained in the translation request is not included in the entries of the TLB 132 (in a case of a cache miss), the translation request receiving unit 131 outputs the memory access instruction and the virtual address to the virtual address/real address translation unit 141. The control processing subsequently proceeds to step S503.

In step S503, the virtual address/real address translation unit 141 receives the memory access instruction and the virtual address. The virtual address/real address translation unit 141 translates the received virtual address into a real address. The virtual address/real address translation unit 141 outputs the received memory access instruction, the translated real address, and an access permission attribute associated with the translated real address to the real address/physical address translation unit 151.

In step S504, the real address/physical address translation unit 151 receives the memory access instruction, the real address, and the access permission attribute. The real address/physical address translation unit 151 translates the received real address into a physical address. The real address/physical address translation unit 151 outputs the received memory access instruction, the translated physical address, and the received access permission attribute to the access permission check unit 161.

In step S505, the access permission check unit 161 receives the memory access instruction, the physical address, and the access permission attribute. The access permission check unit 161 checks (determines) whether an access permission violation occurs based on the received memory access instruction and the received access permission attribute; in other words, the access permission check unit 161 determines based on the access permission attribute whether it is allowed to perform the processing indicated by the memory access instruction with respect to the address targeted for the memory access. In a case where it is determined that no access permission violation occurs (OK), the control processing proceeds to step S506. In a case where it is determined that an access permission violation occurs (NG), the control processing proceeds to step S509.

In step S506, the access permission check unit 161 outputs the received access permission attribute and the received physical address to the TLB 132. The TLB 132 stores therein the virtual address received from the translation request receiving unit 131, and the access permission attribute and the physical address, which are received from the access permission check unit 161, in association with each other.

In step S507, the access permission check unit 161 receives the memory access instruction, the physical address, and the access permission attribute. The access permission check unit 161 checks (determines) whether an access permission violation occurs based on the received memory access instruction and the received access permission attribute; in other words, the access permission check unit 161 determines based on the access permission attribute whether it is allowed to perform the processing indicated by the memory access instruction with respect to the address targeted for memory access. In a case where it is determined that no access permission violation occurs (OK), the control processing proceeds to step S508. In a case where it is determined that an access permission violation occurs (NG), the control processing proceeds to step S510.

In step S508, the access permission check unit 161 performs a memory access operation for the received physical address of the memory 201.

In step S509, the access permission check unit 161 outputs the received access permission attribute and the received physical address to the TLB 132. The TLB 132 stores therein the virtual address received from the translation request receiving unit 131, and the access permission attribute and the physical address, which are received from the access permission check unit 161, in association with each other.

In step S510, the access permission check unit 161 sets a retranslation flag to a ON state and notifies the translation request receiving unit 131 of the retranslation flag.

In step S511, upon receiving the retranslation flag, the translation request receiving unit 131 outputs the retranslation flag and the virtual address contained in the translation request to the virtual address/real address translation unit 141. The virtual address/real address translation unit 141 receives the retranslation flag and the virtual address. The virtual address/real address translation unit 141 translates the received virtual address into a real address. The virtual address/real address translation unit 141 outputs the retranslation flag and the translated real address to the real address/physical address translation unit 151.

In step S512, the real address/physical address translation unit 151 receives the retranslation flag and the real address. The real address/physical address translation unit 151 translates the received real address into a physical address.

In step S513, upon receiving the retranslation flag, the virtual address/real address translation unit 141 records the received virtual address in the translation failure log area 171 as an error log entry. Upon receiving the retranslation flag, the real address/physical address translation unit 151 records the received real address in association with the virtual address in the translation failure log area 171 as an error log entry. It is noted that, the virtual address/real address translation unit 141 may record the received virtual address and the translated real address in association with each other in the translation failure log area 171 as an error log entry upon receiving the retranslation flag.

Because when to record an error log entry is not important (the error log entry only has to be recorded), in this embodiment, the address translation operation for obtaining information required at a normal time and the address translation operation for obtaining information required at only an abnormal time are performed separately by using the existing resource. Reducing the scale of resource required for the TLB as in the embodiment leads more effectively to the reduction in the circuit area and power consumption.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processing device, comprising:
a memory including a log area; and
a processor coupled to the memory and the processor configured to:
output a memory access instruction issued by a process executed on a virtual machine and a virtual address targeted by the memory access instruction;
perform first translation of translating the virtual address into a real address of a virtual memory;
perform second translation of translating the real address into a physical address of a physical memory;
determine, based on the memory access instruction and an access permission attribute of the real address, whether an access permission violation occurs;
perform, upon determining that an access permission violation occurs, retranslation of translating the virtual address into the real address, wherein the retranslation occurs without accessing a translation lookaside buffer; and
record the virtual address and the real address obtained by the retranslation in the log area.

2. The processing device according to claim 1, wherein the processor is further configured to:
determine whether a cache includes the virtual address; and
perform the first translation and the second translation upon determining that the cache does not include the virtual address.

3. The processing device according to claim 2, wherein the processor is further configured to: store the virtual address, the access permission attribute, and the physical address in the cache upon performing the first translation and the second translation and not to store the real address in the cache.

4. A method of controlling a processing device, the method comprising:
outputting, by a processor, a memory access instruction issued by a process executed on a virtual machine and a virtual address targeted by the memory access instruction;
performing first translation of translating the virtual address into a real address of a virtual memory;
performing second translation of translating the real address into a physical address of a physical memory;
determining, based on the memory access instruction and an access permission attribute of the real address, whether an access permission violation occurs;
performing, upon determining that an access permission violation occurs, retranslation of translating the virtual address into the real address, wherein the retranslation occurs without accessing a translation lookaside buffer; and
recording the virtual address and the real address obtained by the retranslation in the log area.

5. The method according to claim 4, further comprising:
determining whether a cache includes the virtual address; and
performing the first translation and the second translation upon determining that the cache does not include the virtual address.

6. The method according to claim 5, further comprising:
storing the virtual address, the access permission attribute, and the physical address in the cache upon performing the first translation and the second translation and not storing the real address in the cache.

* * * * *